United States Patent [19]

Tajima et al.

[11] 4,029,619

[45] * June 14, 1977

[54] METHOD OF PREPARING VINYL CHLORIDE RESINS

[75] Inventors: Shigenobu Tajima, Joetsu; Kazuhiko Kurimoto, Ibaragi, both of Japan

[73] Assignee: Shinetsu Chemical Company, Tokyo, Japan

[ * ] Notice: The portion of the term of this patent subsequent to Sept. 14, 1993, has been disclaimed.

[22] Filed: Dec. 5, 1972

[21] Appl. No.: 312,306

[30] Foreign Application Priority Data

Dec. 7, 1971 Japan .......................... 46-4698805

[52] U.S. Cl. .......................... 260/23 XA; 526/74; 526/210; 526/216; 526/911; 526/331; 526/345
[51] Int. Cl.² .................................... C08L 91/60
[58] Field of Search ............ 260/85.5, 92.8, 23 XA; 526/181, 74, 210, 216, 911

[56] References Cited

UNITED STATES PATENTS 3,370,028  2/1968  De Wald ............... 260/92.8 W
3,551,399  12/1970  Yonezu ................ 260/85.5

FOREIGN PATENTS OR APPLICATIONS 698,359  10/1953  United Kingdom

*Primary Examiner*—Melvyn I. Marquis
*Assistant Examiner*—W. E. Parker
*Attorney, Agent, or Firm*—Bierman & Bierman

[57] ABSTRACT

Vinyl chloride monomer is polymerized in aqueous medium under the influence of oil soluble polymerization initiators in the presence of alkali metal salts of higher fatty acid, higher alcohols and/or higher fatty acids, and hydroxides of alkali metals in certain amounts respectively, to produce vinyl chloride resin, stable for making resin/plasticizer pastes, mostly composed of particles having diameters lying between 0.1 and 2 microns. The resins are suitable for making resin/plasticizer pastes that have a low initial viscosity, little change in viscosities during storage, good thermal stability and excellent degassing property. Reduced deposition of polymer scales on the walls of the polymerization vessels was successful.

12 Claims, No Drawings

METHOD OF PREPARING VINYL CHLORIDE RESINS

This invention relates to improvements in the production of vinyl chloride resins, particularly suitable making pastes by mixing themselves with a plasticizer. (Such vinyl chloride resins will hereinafter be called polyvinyl chloride paste resins or, simply, paste resins, as the case may be.) The polymer/plasticizer pastes produced from the polyvinyl chloride paste resins may, by using their fluidity, be processed further into various articles by, for example, pouring themselves into molds or by coating themselves over substrates, followed by heating. For such purposes, the polyvinyl chloride paste resins are required to be capable of being uniformly and smoothly mixed with a plasticizer and producing the polymer/plasticizer pastes having a low viscosity, and also required to contain particles having diameters continuously ranging from about 0.1 to 2 microns for the most part. But no suitable resins have been obtained either by a usual emulsion polymerization or suspension polymerization, which produces polymers containing too fine or coarse particles, respectively. Consequently, there have been made various proposals for the selection of emulsifiers and catalysts to be used as well as polymerization conditions. For example, British patent specification No. 698,359 proposed polymerization of vinyl chloride under the influence of a monomer-soluble catalyst in the presence of water-soluble and monomer-soluble emulsifying agents. Another example, U.S. Pat. No. 3,551,399 proposed to add a step of homogenation to the polymerization system. However, those proposals have witnessed such a defect that the resulting latex is coagulated to unfavorably affect not only the polymerization reactions but also the later processes, that the latex contains partially agglomerated particles which separate out to decrease the rate of yield, that much deposition of polymer scales usually takes place on the walls of the polymerization vessel to lower the operational efficiency and the quality of the pastes made therefrom, or that an attempt to overcome the above defects results in complication of the polymerization steps or in creation of finer particles than desired in the polymer to damage its viscosity property.

Furthermore, the polyvinyl chloride paste resins are required to be such that the resulting polymer/plasticizer pastes will have little change in viscosities during storage and a good thermal stability as well as easy degassing process. But, none of these requisites have been attained by the various proposals so far put forward.

It is an object of the invention to provide a method of preparing vinyl chloride resins, most part of which is composed of particles having diameters continuously ranging from about 0.1 to 2 microns, in the form of a latex having an excellent mechanical stability in good yield, causing very little deposition of polymer scales on the polymerization vessel.

It is another object of the invention to provide a method of preparing polyvinyl chloride paste resins which are capable of producing polymer/plasticizer pastes having a low initial viscosity, little change in viscosities during storage and a good thermal stability and also excellent degassing property.

It is a further object of the invention to provide a method which will solve all the various defects and questions as specified above at the same time.

The objects have been accomplished by a method of polymerizing under the influence of oil-soluble polymerization initiators vinyl chloride or a mixture of copolymerizable monomers containing at least 50% by weight of vinyl chloride in aqueous medium in the presence of a. from 0.5 to 4% by weight, based on the weight of the monomer mixture, of alkali metal salts of higher fatty acids, having from 8 to 18 carbon atoms, b. from 0.05 to 3% by weight, based on the weight of the monomer mixture, and equivalent to from 4 to 75% by weight of the weight of the above-mentioned alkali metal salts, of higher alcohols and higher fatty acids, having from 8 to 18 carbon atoms, alone or in combination, and c. from 0.002 to 0.1% by weight, based on the weight of the monomer mixture, of hydroxides of alkali metals.

The characteristics of this invention will be described in detail in the following.

It is known that an alkaline substance may be added to a polymerization system in order to reduce the polymer scale deposition on the walls of the polymerization vessel, as has generally been observed in the case of suspension polymerization. However, the inventors of the invention have conducted researches to discover that in an emulsion polymerization wherein a typical synthetic surface active agent, such as sodium alkylbenzene sulfonate or sodium alkyl sulfate, was used or in that emulsion polymerization to which system a higher alcohol or higher fatty acid was added, no reduction of polymer scale desposition was witnessed even in the presence of a hydroxide of alkali metal, while the resulting latex was apt to be coagulated and the further resulting polymer/plasticizer pastes exhibited high viscosities. In fact, although the alkali metal salts of higher fatty acids, having from 8 to 18 carbon atoms, represented by most popularly known surface active agents like soap, were known to be useful for preparing vinyl chloride resins which had better thermal stability than those prepared by use of the above-mentioned synthetic surface active agents instead, they (the alkali metal salts of higher fatty acids) having weak emulsifying power, compared to the synthetic surface active agents, have been found to be incapable of acting to produce mechanically stable latices. And yet, in order to attain the stability of the latices, it has been required to use them in a very great amount, which would result in producing pastes adversely affected with respect to their viscosity, degassing property and transparency, and as such, the pastes thus produced have been proved applicable only for limited uses. On the other hand, it has been discovered and ascertained that by the method of the present invention in which vinyl chloride was polymerized in aqueous medium containing an oil-soluble polymerization initiator in the presence of the higher alcohols or higher fatty acids and the hydroxide of alkali metal in the amounts as set forth together with the alkali metal salts of higher fatty acid in a not excessive amount, there were produced mechanically stable polymer latices having particles continuously ranging from about 0.1 to 2 microns, with very little build-up of polymer scales on the polymerization vessel, and also that such polymer latices could usefully be used for making pastes which were less viscous, subjected to little change during storage, easily degassed and suitable for further processing into molded and other articles having excellent transparency and improved in thermal stability.

The first compounds as used in the method of the invention, i.e., alkali metal salts of high fatty acids, are such that particularly have from 8 to 18 carbon atoms, preferably from 12 to 18 carbon atoms in the molecule. Their examples are sodium laurate, potassium laurate, sodium myristate, potassium myristate, sodium palmitate, potassium palmitate, sodium stearate and potassium stearate, used alone or together. They should be used in an amount of from 0.5 to 4% by weight based on the weight of the monomer mixture. If it is less than 0.5%, it will not only allow to yield polymers with particles having diameters more than 2 microns, but also cause to inhibit the polymerization reactions occasionally due to coagulations resulting from remarkable decreases in dispersion stability of the polymerization medium. If, on the other hand, it is more than 4%, the polymers will have extremely fine particles, which will then result in inducing the pastes produced therefrom to contain considerably large amounts of the alkali metal salts to impair their degassing property and, further, in making it difficult to keep their viscosity within the desired limits.

The second compounds, i.e., higher alcohols and higher fatty acids used by the method of the invention, are examplified by lauryl alcohols, cetyl alcohols, stearyl alcohols for the higher alcohols and lauric acids, myristic acids, palmitic acids and stearic acids for the higher fatty acids. Each of these compounds acts not only as dispersion stabilizing assistant but also as a regulator synergetically with the above-mentioned first compounds in the adjustment of the particle size of the paste resins as desired. For purposes of achieving the functional effects successfully, those compounds should essentially be used in an amount equal to from 0.05 to 3% by weight based on the weight of the monomer mixture and, at the same time, equivalent to from 4 to 75% of the weight of the first compounds used. If the compound is used in an amount less than 0.05% by weight based on the weight of the monomer mixture, the resulting polymer will have very fine particles and be proved unsuitable for making pastes, particles of which should essentially lie between 0.1 and 2 microns. If, on the other hand, an amount of the compound is more than 3% by weight, the resulting polymer will be unsuitable producing mechanically stable pastes which should have excellent degassing property and give good transparency to their molded articles.

The third compounds used by the method of the invention, i.e., hydroxides of alkali metals may be exemplified by sodium hydroxides, potassium hydroxides and lithium hydroxides. They also include compounds that are convertible in water into the hydroxides, namely, sodium oxides, potassium oxides and lithium oxides. These compounds act to prevent the surface activities of the abovementioned first and second compounds from being deteriorated by the hydrogen chloride generated during the polymerization. Furthermore, the third compounds effectively work to prevent the adhesion of polymer scales to the inner walls of the polymerization vessel. The amount of the compounds to be used should essentially be from 0.002 to 0.1% by weight based on the monomer mixture, since if it exceeds that limit, salting out of polymer and lowering of the thermal stability of the polymer will take place.

The polymerization initiators to be used by the method of the invention should be soluble in oil or monomer and include azo compounds and peroxides, such as azobisisobutylonitrile, azobis dimethylvaleronitrile, lauroyl peroxide, benzoyl peroxide, isopropyl peroxydicarbonate, acetyl cyclohexyl sulfonyl peroxide and t-butyl peroxypivalate.

This invention may also be applied to mixture of vinyl chloride with copolymerizable monomers, containing at least 50% by weight of the vinyl chloride. Such co-monomers are, for example, vinyl acetate, vinylidene chloride, acrylonitrile, acrylic acid ester, methacrylic acid ester and maleic acid.

The invention will be more clearly understood with reference to the examples which follow; however, these examples are intended to illustrate the invention and are not to be construed to limit the scope of the invention. The viscosity, degassing property, thermal stability and transparency as mentioned in those examples are what were measured or determined in the following manners.

Viscosity: 200 parts by weight of polymer were mixed uniformly with 100 parts of dioctyl phthalate and 3 parts of tricresyl phosphate. The mixture was degassed to produce pastes. The pastes thus produced were allowed to stand for 24 hours at 30° C and 48 hours at 30° C and then measured their respective viscosities by a B-type viscometer.

Degassing property: 200 parts by weight of polymer, 120 parts by weight of dioctyl phthalate and 6 parts by weight of tricresyl phosphate were mixed together for 10 minutes by an Ishikawa Kneading machine. To the resulting mixture were added 40 parts by weight of dioctyl phthalate for further mixing for 20 minutes, to produce a liquid which contained air bubbles. The liquid was poured into a 200 c.c. beaker. The beaker was then placed in a desiccator connected with a vacuum pump. As the vaccum pump was operated, the desiccator gradually became vacuous and the liquid containing air bubbles expanded and rose up to some extent or as high as the level of the mouth of the beaker, as the case may be, when the vacuum pump was stopped operating to make the inner pressure of the desiccator normal, and consequently make the expanded liquid fall down to the original level. This procedure, which is called degassing operation, was repeated till the air bubbles were completely removed. The degassing property was indicated by what extent the liquid expanded to when no air bubble was witnessed or by the number of cycles of such repetition. For instance, when a degassing property is indicated as 0.7, it means that the air bubble containing liquid expanded up to the level only 70% above its original surface level in the beaker, when no more air bubble was witnessed, or the degassing was completed.

Thermal stability: 100 parts by weight of polymer, 80 parts by weight of dioctyl phthalate and 2 parts by weight of tricresyl phosphate were uniformly mixed. The mixture was degassed and then heated at 180° C for 10 minutes, to produce sheets 1 mm thick. The sheet was placed in a gear-type oven kept at 180° C in order to find how long (in munites) it took to become colored or blackened.

Transparency: The sheet as prepared and used in the measurement of the above-mentioned thermal stability was employed to determine the transparency with the naked eye.

EXAMPLE 1.

440 parts by weight of water, 220 parts by weight of vinyl chloride, 0.11 part of azobisdimethylvaleronitrile and one each of alkali metal salts of higher fatty acids, higher alcohols or higher fatty acids, and hydroxides of alkali metals in varied amounts as set forth in the following Table 1 were put into respective polymerization vessels made of stainless steel. The content of each polymerization vessel was preliminary stirred at the rate of 70 r.p.m. for one hour and then heated to 47.5° C for polymerization which continued for 15 hours. The results are shown in Table 1.

and one each of the additives in varied amounts as set forth in the following Table 2 were put into respective polymerization vessels made of stainless steel. The content of each vessel was stirred at the rate of 70 r.p.m. for 1 hour, and then heated to 47.5° C for polymerization which continued for 13 hours. the results are shown in Table 2.

Table 2

| Test No. | 7 | 8 | 9 | 10* | 11* | 12* | 13* | 14* |
|---|---|---|---|---|---|---|---|---|
| Additive: (% by weight based on monomer) | | | | | | | | |
| Alkali metal salt of higher acid | Sodium stearate 0.8 | Sodium stearate 0.8 | Sodium stearate 0.8 | Sodium stearate 0.8 | Sodium stearate 0.8 | Dodecyl benzene sodium sulfonate 0.8 | Sodium stearate 0.8 | Sodium stearate 0.8 |
| Higher alcohol or higher fatty acid | Cetyl alcohol 0.5 | Cetyl alcohol 0.5 | Cetyl alcohol 0.5 | Cetyl alcohol 0.5 | Cetyl alcohol 0.5 | Cetyl alcohol 0.5 | N-butyl alcohol 0.5 | Nil |
| Hydroxide of alkali metal | NaOH 0.005 | NaOH 0.05 | NaOH 0.1 | NaOH 0.001 | NaOH 0.5 | NaOH 0.05 | NaOH 0.05 | NaOH 0.05 |
| pH of polymerization medium | 10.6 | 12.0 | 12.3 | 9.7 | 12.7 | 12.1 | 11.9 | 12.0 |
| Stability of latex | Stable | Stable | Stable | Stable | Unstable | Unstable | Unstable | Unstable |
| Polymer scale deposition (g) | 30 | 15 | 5 | 50 | 10 | 550 | 480 | 110 |
| Viscosity: (cps) After 24 hours at 30° C | 970 | 1050 | 1100 | 1500 | 1700 | 2100 | 3500 | 3600 |
| After 48 hours at 30° C | 2600 | 2550 | 2700 | 3000 | 3100 | 3600 | 8100 | 7700 |
| Degassing property | 0.2 | 0.1 | 0.3 | 0.5 | 5 | 11 | 16 | 15 |
| Thermal Stability | 60 min./more | 60 min./more | 60 min./more | 60 min./more | 60 min./more | 60 min. | 60 min. | 60 min./more |
| Transparency | Good | Good | Good | Good | Good | Good | Good | No good |
| Polymer particle diameter (microns) | 0.6 | 0.6 | 0.7 | 0.5 | 0.5 | 0.6 | 0.1 | 0.2 |

*Comparative test

EXAMPLE 3

440 parts by weight of water, 200 parts by weight of vinyl chloride, 20 parts by weight of vinyl acetate, 0.022 part by weight of acetyl cyclohexyl sulfonyl peroxide and one each of the additives in varied amounts as set forth in the following Table 3 were put into respective polymerization vessels made of stainless steel.

Table 1

| Test No. | 1 | 2 (Comparative) | 3 | 4 (Comparative) | 5 | 6 (Comparative) |
|---|---|---|---|---|---|---|
| Additive: (% by weight based on monomer) | | | | | | |
| Alkali metal salt of higher fatty acid | Sodium laurate 0.6 | Sodium laurate 0.6 | Potassium myristate 0.6 | Potassium myristate 0.6 | Sodium stearate 1.3 | Sodium stearate 1.3 |
| Higher alcohol or higher fatty acid | Cetyl alcohol 0.4 | Cetyl alcohol 0.6 | Stearic acid 0.4 | Stearic acid 0.6 | Lauryl alcohol 0.6 | Lauryl alcohol 0.6 |
| Hydroxide of alkali metal | NaOH 0.01 | None | LiOH 0.01 | None | KOH 0.01 | None |
| pH of polymerization medium | 11.0 | 10.5 | 11.2 | 10.3 | 11.0 | 10.8 |
| Stability of latex | Stable | Unstable | Stable | Unstable | Stable | Unstable |
| Polymer scale deposition (g) | 10 | 200 | 25 | 250 | 10 | 120 |
| Viscosity: (cps) After 24 hours at 30° C | 850 | 1500 | 1050 | 1750 | 1050 | 1170 |
| After 48 hours at 30° C | 2000 | 2400 | 3000 | 3200 | 2700 | 2650 |
| Degassing property | 0.2 | 0.3 | 0.5 | 0.3 | 1.5 | 1.1 |
| Thermal stability | 60 min. or more | 60 min. | 60 min. or more | 60 min. | 60 min. or more | 60 min. |
| Transparency | Good | Good | Good | Good | Good | Good |
| Polymer particle diameter (microns) | 0.8 | 0.6 | 0.8 | 0.8 | 0.6 | 0.7 |

EXAMPLE 2

440 parts by weight of water, 220 parts by weight of vinyl chloride, 0.022 part of acetyl sulfonyl peroxide the content of each vessel was stirred at the rate of 70 r.p.m. for 1 hour, and then heated to 52° C for polymerization which continued until the internal pressure fell to 4.5 kg/cm². The results are shown in Table 3.

Table 3

| Test No. | 15 | 16 | 17 | 18 | 19 | 20 (Comparative) | 21 (Comparative) |
|---|---|---|---|---|---|---|---|
| Additive: (% by weight based on monomer) | | | | | | | |
| Alkali metal salt of higher fatty acid | Sodium stearate 0.6 | Sodium stearate 0.6 | Sodium stearate 0.8 | Sodium stearate 1.0 | Sodium stearate 3.0 | Sodium stearate 0.4 | Sodium laurate 0.4 |
| Higher alcohol or higher fatty acid | Lauric acid 0.10 | Lauric acid 0.40 | Lauric acid 0.60 | Lauric acid 0.75 | Lauric acid 1.5 | Lauric acid 0.3 | Lauric acid 0.3 |
| Hydroxide of alkali metal | Potassium hydroxide 0.03 | Potassium hydroxide 0.03 | Potassium hydroxide 0.03 | Potassium hydroxide 0.03 | Potassium hydroxide 0.05 | None | Potassium hydroxide 0.03 |
| pH of polymerization medium | 11.0 | 11.5 | 10.9 | 11.4 | 10.7 | 9.7 | 10.6 |
| Stability of latex | Stable | Stable | Stable | Stable | Stable | Unstable | Unstable |
| Polymer scale deposition (g) | 15 | 20 | 40 | 50 | 50 | 120 | 400 |
| Viscosity: (cps) | | | | | | | |
| After 24 hours at 30° C | 1500 | 1400 | 1500 | 1300 | 1470 | 2000 | 2300 |
| After 48 hours at 30° C | 2800 | 2600 | 2900 | 3000 | 3850 | 4500 | 4000 |
| Degassing property | 0.3 | 0.4 | 0.4 | 0.5 | 1.1 | 0.7 | 15 |
| Thermal stability | 60 min. or more | 60 min. or more | 60 min. or more | 60 min. or more | 60 min. or more | 60 min. | 60 min. or more |
| Transparency | Good | Good | Good | Good | Good | Good | Good |
| Polymer particle diameter (microns) | 0.7 | 0.7 | 0.5 | 0.4 | 0.5 | 1.0 | 0.8 |

EXAMPLE 4

The procedure with conditions identical to that of Test 1 of Example 1, as described in Table 1, above, was repeated with the exception that 0.06% by weight of lauryl peroxide and 0.015% by weight of isopropyl peroxide, both based on the weight of monomer, were used as catalysts instead of the azobisdimethylvaleronitrile. The results are as follows:

| | |
|---|---|
| pH of the polymerization medium | 10.7 |
| Mechanical stability of latex | Stable |
| Viscosity: After 24 hours at 30° C | 950 cps |
| After 48 hours at 30° C | 2,800 cps |
| Degassing property | 0.3 |
| Thermal stability | 60 min. or more |
| Transparency | Good |
| Polymer particle size | 0.8 microns |
| Polymer scale deposition | 20 g |

What is claimed is:

1. A method comprising polymerizing in aqueous medium, under the influence of at least one oil soluble polymerization initiator, vinyl chloride or a mixture thereof with at least one copolymerizable monomer, containing at least 50% by weight of the vinyl chloride in the presence of (a) from 0.5 to 4% by weight, based on the weight of the monomer mixture, of at least one alkali metal salt of higher fatty acid, having from 8 to 18 carbon atoms in the molecule, (b) from 0.05 to 3% by weight, based on the weight of the monomer mixture and equivalent to from 4 to 75% by weight of said alkali metal salt, of at least one higher alcohol or higher fatty acid, having 8 to 18 carbon atoms, alone or in combination, and (c) from 0.001 to 0.1% by weight, based on the weight of the monomer mixture, of at least one hydroxide of alkali metal.

2. The method as claimed in claim 1 wherein said alkali metal salt of higher fatty acid is selected from the gourp consisting of sodium laurate, potassium laurate, sodium myristate, potassium myristate, sodium palmitate, potassium palmitate, sodium stearate and potassium stearate.

3. The method as claimed in calim 1 wherein said higher alcohol is selected from the group consisting of lauryl alcohols, cetyl alcohols and stearyl alcohols, and said higher fatty acid is selected from the group consisting of lauric acids, myristic acids, palmitic acids and stearic acids.

4. The method as claimed in claim 1 wherein said hydroxide of alkali metal is selected from the group consisting of sodium hydroxides, potassium hydroxides, lithium hydroxides and sodium oxides.

5. The method as claimed in claim 1 wherein said copolymerizable monomer is selected from the group consisting of vinyl acetate, vinylidene chloride, acrylonitrile, acrylic acid esters, methacrylic acid esters and maleic acids.

6. The method as claimed in claim 1 wherein said oil soluble polymerization initiator is selected from the group consisting of azobisisobutylonitrile, azobisdimethylvaleronitrile, lauroyl peroxides, benzoyl peroxides, isopropyl peroxydicarbonate, acetyl cyclohexyl sulfonyl peroxides and tertiarybutyl peroxypivalate.

7. A method comprising polymerizing vinyl chloride under the influence of at least one oil soluble polymerization initiator in aqueous medium in the presence of (a) from 0.5 to 4% by weight, based on the weight of the monomer, of at least one alkali metal salt of saturated higher fatty acid, having from 12 to 18 carbon atoms in the molecule. (b) from 0.05 to 3% by weight, based on the weight of the monomer and equivalent to from 4 to 75% by weight of said alkali metal salt, of at least one saturated higher fatty alcohol or saturated higher fatty acid, having from 12 to 18 carbon atoms in the molecule, alone or in combination, and (c) from 0.001 to 0.1% by weight, based on the weight of the monomer, of at least one hydroxide of alkali metal.

8. The method as claimed in claim 7 wherein said oil soluble polymerization initiator is an azo compound or an organic peroxide, alone or in combination.

9. The method as claimed in claim 7 wherein said oil soluble polymerization initiator is selected from the group consisting of azobisisobutylonitrile, azobisdimethylvaleronitrile, lauroyl peroxides benzoyl peroxides, isopropyl peroxydicarbonate, acetyl cyclohexyl sulfonyl peroxides and tertiarybutyl peroxypivalate.

10. A method comprising polymerizing in aqueous medium under the influence of at least one oil soluble polymerization initiator a mixture containing at least 80% by weight of vinyl chloride and at most 20% by weight of vinyl acetate in the presence of (a) from 0.5 to 4% by weight, based on the weight of the monomer mixture, of at least one alkali metal salt of saturated higher fatty acid, having from 12 to 18 carbon atoms in the molecule, (b) from 0.05 to 3% by weight, based on the weight of the monomer mixture and equivalent to from 4 to 75% by weight of said alkali metal salt, of at least one saturated higher fatty alcohol or saturated higher fatty acid, having from 12 to 18 carbon atoms in the molecule, alone or in combination, and (c) from 0.001 to 0.1% by weight, based on the weight of the monomer mixture, of at least one hydroxide of alkali metal.

11. The method as claimed in claim 10 wherein said oil soluble polymerization initiator is an azo compound or an organic peroxide, alone or in combination.

12. The method as claimed in claim 10 wherein said oil soluble polymerization initiator is selected from the group consisting of azobisisobutylonitrile, azobisdimethylvaleronitrile, lauroyl peroxides, benzoyl peroxides, isopropyl peroxydicarbonate, acetyl cyclohexyl sulfonyl peroxides and tertiarybutyl peroxypivalate.

* * * * *